(12) United States Patent
Zarcone et al.

(10) Patent No.: US 11,728,999 B2
(45) Date of Patent: *Aug. 15, 2023

(54) SECURE ROUTER AUTHENTICATION

(71) Applicant: Comcast Cable Communications, LLC, Philadelphia, PA (US)

(72) Inventors: Christopher Zarcone, Marlton, NJ (US); John Jason Brzozowski, Schwenksville, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 259 days.

This patent is subject to a terminal disclaimer.

(21) Appl. No.: 17/144,863

(22) Filed: Jan. 8, 2021

(65) Prior Publication Data

US 2021/0211297 A1 Jul. 8, 2021

Related U.S. Application Data

(63) Continuation of application No. 14/316,406, filed on Jun. 26, 2014, now Pat. No. 10,931,456.

(51) Int. Cl.
*H04L 9/32* (2006.01)
*H04L 9/08* (2006.01)
*H04L 9/40* (2022.01)
*H04L 45/02* (2022.01)

(52) U.S. Cl.
CPC .......... *H04L 9/3242* (2013.01); *H04L 9/0863* (2013.01); *H04L 9/3218* (2013.01); *H04L 63/08* (2013.01); *H04L 63/0823* (2013.01); *H04L 45/02* (2013.01)

(58) Field of Classification Search
CPC ..... H04L 63/00; H04L 9/3218; H04L 9/3242; H04L 9/0861
See application file for complete search history.

(56) References Cited

U.S. PATENT DOCUMENTS

| | | | | |
|---|---|---|---|---|
| 6,651,171 | B1 * | 11/2003 | England | G06F 21/53 713/193 |
| 7,949,876 | B2 * | 5/2011 | Haddad | H04L 63/1441 713/168 |
| 8,443,194 | B2 * | 5/2013 | Liu | H04L 9/0844 713/168 |
| 8,498,414 | B2 * | 7/2013 | Rossi | H04L 61/4511 380/247 |

(Continued)

OTHER PUBLICATIONS

Applied Cryptography, Second Edition: Protocols, Algorithms, and Source Code in C (cloth), Bruce Schneier, Published Jan. 1, 1996, © 1996-2000 EarthWeb, Inc., 1027 pages.

(Continued)

*Primary Examiner* — Linglan Edwards
(74) *Attorney, Agent, or Firm* — Banner & Witcoff, Ltd.

(57) ABSTRACT

A first computing device may authenticate itself to a second computing device by providing a verifier value based on a private key. The verifier value may be sent to the second computing device, and a session key may be determined based on the private key. A secure message may comprise routing information associated with the first computing device and a hash value based on the routing information and the session key, and the first computing device may communicate with the second computing device using the session key.

52 Claims, 6 Drawing Sheets

(56) References Cited

U.S. PATENT DOCUMENTS

| | | |
|---|---|---|
| 9,078,126 B2* | 7/2015 | Yi .................... H04L 9/0841 |
| 2003/0028763 A1 | 2/2003 | Malinen et al. |
| 2003/0233450 A1 | 12/2003 | Carley |
| 2004/0111615 A1 | 6/2004 | Nyang et al. |
| 2007/0061574 A1 | 3/2007 | Shelest et al. |
| 2007/0076724 A1 | 4/2007 | Hall et al. |
| 2008/0162936 A1 | 7/2008 | Haddad |
| 2012/0110334 A1 | 5/2012 | Rossi |
| 2013/0152189 A1 | 6/2013 | Lee et al. |
| 2015/0271159 A1 | 9/2015 | Springer et al. |
| 2016/0103991 A1* | 4/2016 | Hsu .................... H04L 63/20 726/18 |

OTHER PUBLICATIONS

US Secure Hash Algorithms (SHA and SHA-based HMAC and HKDF), D. Eastlake, et al., May 2011, © 2011 IETF Trust, https://tools.ietf.org/html/rfc6234[Mar. 24, 2014 11:36:42 AM], 88 pages.
Neighbor Discovery for IP versions 6 (IPv6), T. Narten, et al., Sep. 2007, © The IETF Trust (2007), pp. 1-97.
Secure Neighbor Discovery (SEND), J. Arkko, et al., Mar. 2005, © The Internet Society (2005), 56 pages.
The SRP Authentication and Key Exchange System, T. Wu, Stanford University, Sep. 2000, © The Internet Society (2000), http://tools/ietf.org/rfc/rfc2945 txt[Mar. 24, 2014 11:33:26 AM], 6 pages.
Diffie-Hellman Key Agreement Method, E. Rescorla, Jun. 1999, © The Internet Society (1999) http://www.ietf.org/rfc/rfc2631.txt[Mar. 24, 2014 11:32:41 AM], 10 pages.
Neighbor Discovery for IP versions 6 (IPv6), T. Narten, et al., Dec. 1998, © The Internet Society (1998), http://www.ietf.org/rfc/rfc2461.txt[Mar. 24, 2014 11:41:23 AM], 65 pages.
RFC 2460—Internet Protocol, Version 6 (IPv6) Specification, S. Deering et al., Dec. 1998, © The Internet Society (1998), https://tools,.ietf.org/html/rfc2460[Mar. 24, 2014 11:30:44 AM], 28 pages.
Public Key Infrastructure, Andrea S. Atzeni, et al. Third European PKI Workshop: Theory and Practice, EuroPKI 2006, Turin, Italy, Jun. 19-20, 2006 Proceedings © Springer-Verlag Berlin Heidelberg 2006, 269 pages.
Internet Control Message Protocol, en.wikkipedia.org/wiki/Internet_Control_Message_Protocol#ICMP_segment_structure, retrieved Oct. 30, 2013, pp. 1-9.
Securing IPv6 Neighbor Discovery Using Address Based Keys (ABKs), James Kempf, et al., Jun. 2002, © The Internet Society (2002), tools.ietf.org/html/draft-kempf-secure-nd-01, pp. 1-34.
Practical Authentication in Large-Scale Internet Applications, a Thesis Presented to the Academic Faculty, by Italo Dacosta, Georgia Institute of Technology, Aug. 2012, pp. 1-207.
Efficient Augmented Password-Only Authentication and Key Exchange for IKEv2, S. Shin et al., Jun. 2012, © 2012 IEIF Trust, www.rfc-editor.org/rfc/rfc6628.txt, pp. 1-20.
Securing IPv6 Neighbor and Router Discovery, J. Arkko, et al., WiSe '02, Sep. 29, 2002, Atlanta Georgia, © 2002 ACM, pp. 1-10.
The TCP/IP Guide—ICMPv6 Router Advertisement and Router Solicitation Messages, retrieved Oct. 30, 2013, www.tcpipguide.com/free/t_ICMPv6RouterAdvertisementandRouteSoliciationMess-2.htm, pp. 1-3.
HMAC: Keyed-Hashing for Message Authentication, H. Krawczyk, et al., Feb. 1997, http://www.ietf.org/rfc/rfc2104.txt[Mar. 24, 2014 11:31:28 AM], pp. 1-8.

* cited by examiner

SECURE ROUTER AUTHENTICATION

CROSS-REFERENCE TO RELATED APPLICATIONS

This application is a continuation of U.S. patent application Ser. No. 14/316,406, filed on Jun. 26, 2014, which is hereby incorporated by reference in its entirety.

BACKGROUND

Among other things, the Internet Protocol (IP) describes discovery protocols. As one example, Neighbor Discovery Protocol (NDP) can be used by nodes to discover each other. For example, the specifications for IP version 6 ("IPv6"), which is a new version of IP, defines a protocol called Neighbor Discovery Protocol ("NDP"). IPv6 nodes (e.g., hosts and routers) use NDP to discover each other, exchange routing information, manage auto-configuration, and perform other tasks important to IP networking.

In some implementations, IP nodes implicitly trust NDP messages generated by other nodes. Without any inherent security mechanisms to provide confidentiality, integrity, or availability, such implementations are susceptible to abuse. In addition, although IPSec (Internet Protocol Security) may be used to secure NDP messages, IPSec requires significant manual configuration and is unwieldy to deploy in large environments.

Subsequent efforts, such as SEcure Neighbor Discovery ("SEND") which uses public-key cryptography and digital certificates, to secure NDP messages still have numerous shortcomings. In practice, an effective deployment of SEND required a significant investment in Public Key Infrastructure ("PKI"), which can be cumbersome and costly to operate. As a result, SEND has been met with limited acceptance.

While attempts have been made to add security to NDP, there are numerous drawbacks that leave room for improvement.

SUMMARY

As described herein, some aspects relate to systems and methods involving secure device authentication using aspects of a zero-knowledge password proof approach are disclosed.

In one example, a device may generate a self-authenticating message including its identity and/or its capability attributes. The device may use a secret value, random nonce, public ephemeral value (PEV), session key, and/or other values to generate the self-authenticating message. The secret value may be unknown to a device receiving the self-authenticating message. With the use of pre-loaded values, including a verifier, the receiving device may compare its own host-generated keyed-hash message authentication code ("HMAC") with the router-generated HMAC to verify the authenticity of the message. In one example, such authentication may be useful, inter alia, on an Internet Protocol (IP) network utilizing NDP.

In one example, aspects may relate to a method involving generating, by a computing device (e.g., wireless router apparatus), a self-authenticating message. The message may include information relating the identity and/or capability attributes of the computing device. At least portions of the message may be hashed using at least a secret value unknown to self-configurable host apparatuses, which receive the message. The self-configurable host apparatuses, upon receipt of the self-authenticating message, may calculate an authentication code (e.g., a hashed message authentication code) to authenticate the message. The host apparatus may use one or more values, such as a public static value, a verifier, a public ephemeral value, and/or other values to calculate the HMAC. The host may compare the generated HMAC to the received router's HMAC to determine if the message is authentic.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
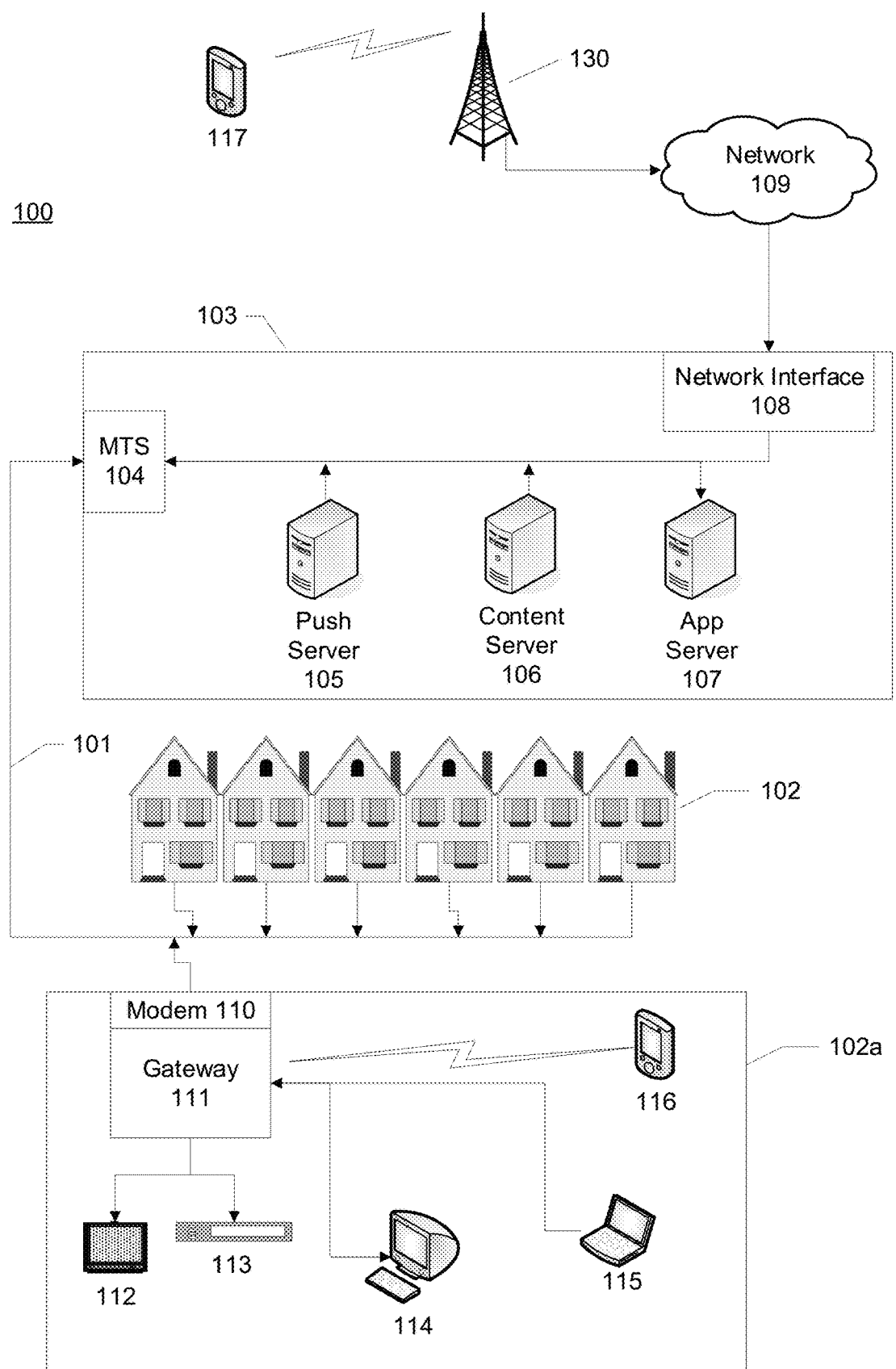
FIG. 1 illustrates an example information distribution network.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Communication protocols exist that use neighbor discovery protocols to discover networks and/or machines (e.g., hosts and routers). Some neighbor discovery protocols operate using particular message types (e.g., a Router Advertisement message type). A newer version of the Internet Protocol, IPv6, includes a version of NDP that also uses a particular Router Advertisement ("RA") message type. However, the NDP defined for IPv6 provides little in the way of native security; this leaves IPv6's RA messages susceptible to abuse and forgery. While solutions like IPSec and SEND have been proposed to improve IPv6's NDP security, they can be cumbersome and/or difficult to implement and have failed to gain widespread acceptance.

Systems and methods disclosed herein can be used for authenticating one or more types of messages communicated between a router and hosts, such as RA messages (or other message types) sent from a router to hosts. Various derivations of the approaches disclosed herein are also contemplated. Specifically, many of the disclosed approaches use variations of zero-knowledge password proofs ("ZKPP") and augmented password-authenticated key agreements ("PAKE") to authenticate particular kinds of NDP messages, such as RA messages, and other kinds of broadcast/multicast messages. In some examples, aspects of the novel approach may be referred to as an end-to-end zero-knowledge password proof for router authentication ("ZKPPRA") solution.

Some aspects disclosed herein relate to message-level authentication as compared to user-level authentication. In addition, some aspects describe the directionality of authentication to be from a centralized router or gateway to one or more hosts (e.g., client computing devices). As such, the authentication protocol may be unidirectional in nature, and may eliminate, in some examples, the need for hosts to provide random nonces as part of the authentication process. In some examples, static values may be used instead, and hosts may not need to transmit information to an authenticating router. The ZKPPRA solution may include one or more of the aforementioned features.

In one example of a ZKPPRA solution, an authentication mechanism and/or protocol may undergo some preparations, such as one or more of the following preparatory measures: (1) preparation stage (e.g., router preparation to produce authenticated protocol data units ("PDUs") or messages); (2) PDU production stage (e.g., production of authenticated PDUs, for example, a signed IPv6 RA message); and/or (3) PDU validation stage (e.g., validation of authenticated PDUs). In addition, in some examples of a ZKPPRA solution one or more of the following preparatory measures may be taken: (1) standardization on specific key exchange algorithms and message digest algorithms, (2) definition of configuration parameters for routers, and/or (3) definition of configuration parameters for hosts. Although the preceding examples have described steps of the process in terms of stages, the disclosure is not so limited. Rather, one or more stages may be conflated into another stage, may be divided into multiple additional stages, may be performed concurrently with another stage, or may be optional, as appropriate.

FIG. 1 illustrates an example information distribution network 100 on which many of the various features described herein may be implemented. The illustrated information distribution network is only one example of a suitable network and is not intended to suggest any limitation as to the scope of use or functionality of the disclosure. The illustrated network should not be interpreted as having any dependency or requirement relating to any component or combination of components in an information distribution.

The network 100 may be a telecommunications network, a multi-service operator (MSO) network, a cable television (CATV) network, a cellular network, a wireless network, an optical fiber network, a coaxial cable network, a hybrid fiber-coaxial (HFC) network, or any other suitable type of information distribution network or combination of networks. For example, the network 100 may be a cellular broadband network communicating with multiple communications access points, such as a wireless communications tower 130. In another example, the network 100 may be a coaxial system comprising a cable modem termination system (CMTS) communicating with numerous gateway interface devices (e.g., a gateway interface device 111 in an example home 102a). In another example, the network 100 may be a fiber-optic service system comprising optical fibers extending from an optical line terminal (OLT) to numerous optical network terminals (ONTs) communicatively coupled with various gateway interface devices. In another example, the network 100 may be a digital subscriber line (DSL) system that includes a local office 103 communicating with numerous gateway interface devices. In another example, the network 100 may be an HFC network in which Internet traffic is routed over both optical and coaxial communication paths to a gateway interface device in or near a user's home. Various aspects of the disclosure may operate on one or more of the networks described herein or any other suitable network architectures now known or later developed.

The network 100 may use a series of interconnected communication links 101 (e.g., coaxial cables, optical fibers, wireless links, etc.) to connect premises such as homes 102 or other user environments to a local office 103. The communication links 101 may include any suitable wired communication links, wireless communication links, communications networks, or combinations thereof. For example, portions of the communication links 101 may be implemented with fiber-optic cable, while other portions of the communication links 101 may be implemented with coaxial cable. The communication links 101 may also include various communications components such as splitters, filters, amplifiers, wireless components, and other suitable components for communicating data. Data may include, for example, internet data, voice data, weather data, content data, and any other suitable information. Content data may include, for example, video content, audio content, media on demand, video on demand, streaming video, television programs, text listings, graphics, advertisements, and other content. A content item may represent an individual piece of content, such as a media content item (e.g., a particular movie, television episode, online video clip, song, audio recording, image, or other media content) or any other data. In some instances, a content item may be fragmented into segments, such as a plurality of two-second video fragments that may be separately addressed and retrieved.

The local office 103 may transmit downstream information signals onto communication links 101, and premises such as a home 102 may receive and process those signals. In certain implementations, communication links 101 may originate from a local office 103 as a single communications path, and may be split into any suitable number of communication links to distribute data to homes 102 and various other destinations. Although the term home is used by way of example, homes 102 may include any type of user environment, such as single family homes, apartment complexes, businesses, schools, hospitals, parks, and other suitable environments and combinations of environments.

The local office 103 may include an interface 104, which may be a computing device configured to manage communications between devices on the network of communication links 101 and backend devices, such as server 105, server 106, and server 107. For example, an interface 104 may be a cable modem termination system (CMTS). The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in homes 102, and to receive upstream communications from those modems on one or more upstream frequencies.

The local office 103 may include one or more network interfaces 108 for communicating with one or more external networks 109. One or more external networks 109 may include, for example, one or more telecommunications networks, Internet Protocol networks, cellular communications networks (e.g., Global System for Mobile Communications (GSM), Code Division Multiple Access (CDMA), and any other suitable 2nd, 3rd, 4th and higher generation cellular communications networks), cellular broadband networks, radio access networks, fiber-optic networks, local wireless networks (e.g., Wi-Fi, WiMAX), satellite networks, and any other suitable networks or combinations of networks.

The local office 103 may include a variety of servers that may be configured to perform various functions. Local office 103 may include one or more push servers 105 for generating push notifications to deliver data, instructions, or both to devices that are configured to detect such notifications. For example, push server 105 may transmit an instruction to a device to transfer service from one wireless network or communications access point to another wireless network or communications access point. Local office 103 may include one or more server computing devices (e.g., content servers 106) configured to provide content (e.g., media content) to devices. Local office 103 may include one or more application servers 107. For example, application server 107 may be used to implement a caching device, such as a cache server, for the content stored in or provided by content server 106.

Homes 102 may include a single family home, an apartment, a restaurant, an office suite, or any other suitable indoor environment and extend to an outdoor environment. Example home 102a may include an interface, which may include device 110, for communicating on communication links 101 with local office 103, one or more external networks 109, or both. For example, device 110 may be a coaxial cable modem (for coaxial cable links 101), a broadband modem (for DSL links 101), a fiber interface node (for fiber-optic links 101), or any other suitable device or combination of devices. In certain implementations, device 110 may be a part of, or communicatively coupled to, gateway interface device that provides access to a gateway 111. The gateway 111 may be, for example, a wireless router, a set-top box, a computer server, or any other suitable computing device or combination.

Figure 2:
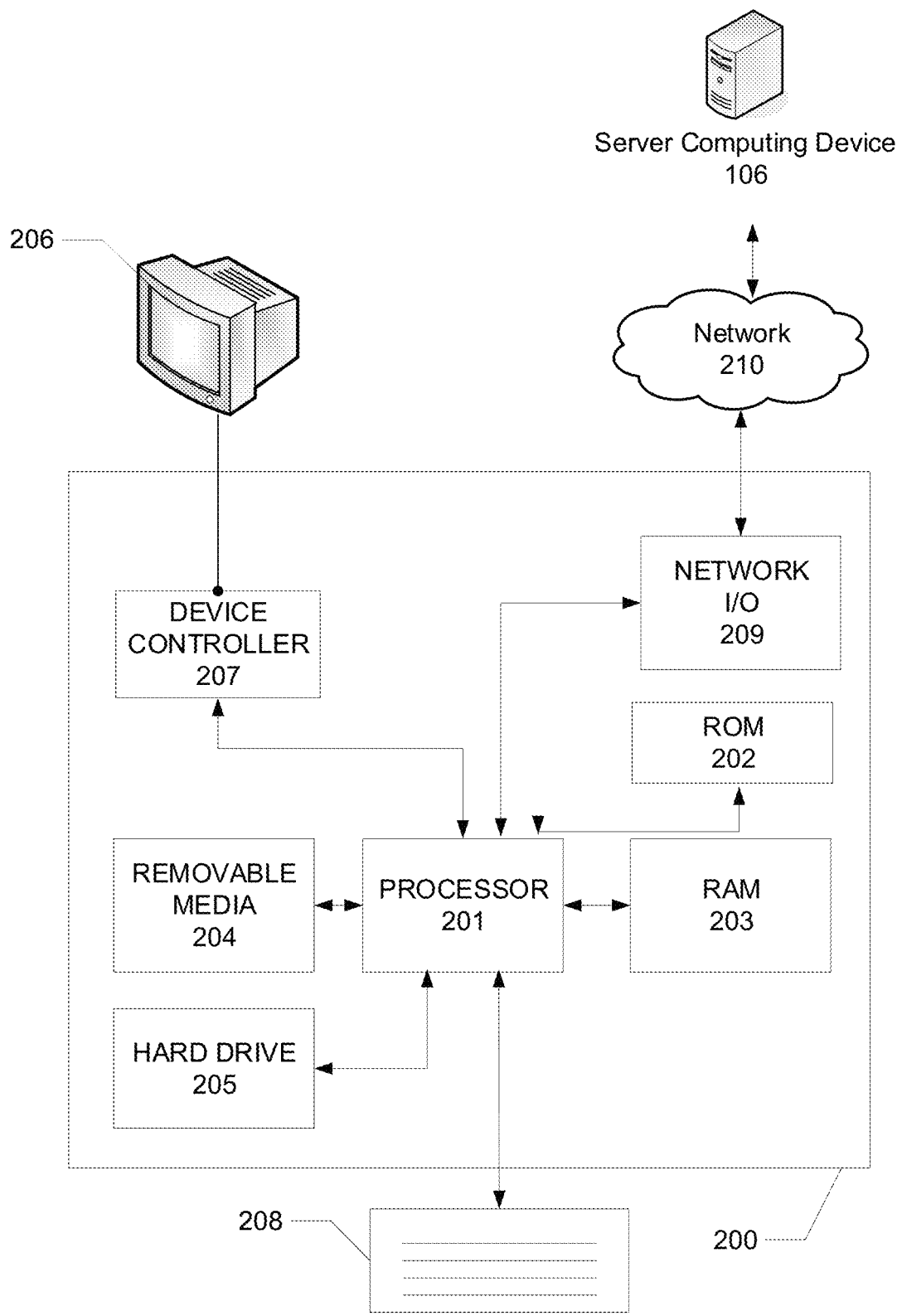
FIG. 2 illustrates an example hardware platform on which the various elements described herein can be implemented.

The gateway interface device 111 may be any suitable computing device for communicating with device 110 to allow one or more other devices in example home 102a to communicate with local office 103, one or more external networks 109, or other devices communicatively coupled thereto. The gateway 111 may include local network interfaces to provide communication signals to user devices in or near example home 102a, such as television 112, set-top box 113, personal computer 114, laptop computer 115, wireless device 116 (e.g., a wireless laptop, a tablet computer, a mobile phone, a portable gaming device), vehicular computing system 117 (e.g., a mobile computing system, navigation system, or entertainment system in an automobile, marine vessel, or aircraft) and any other suitable device FIG. 2 illustrates general elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein. The various computing devices, servers and hardware described herein may be implemented using software running on another computing device.

Figure 3:
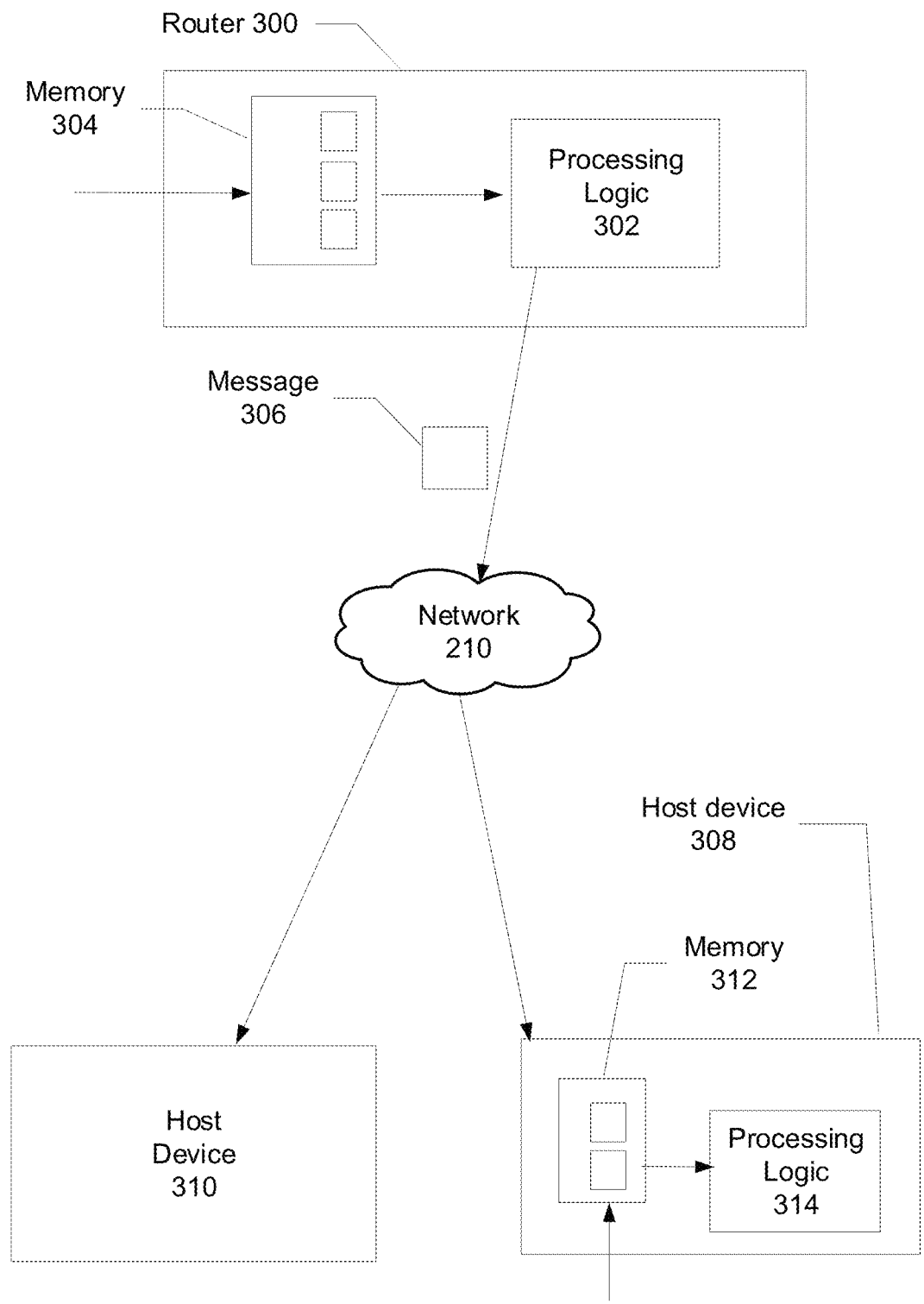
FIG. 3 illustrates a system according to one or more aspects of the disclosure.

Referring to FIG. 3, a router 300 in communication with a plurality of hosts 308, 310 may generate one or more messages comprising information related to one or more of the identity and/or capability attributes of the router 300. The router 300 may hash at least a portion of the message using at least a secret value unknown to the hosts 308, 310, and then send the self-authenticating message 306 over the network 210 (e.g., a wired or wireless network) to one or more of the hosts 308, 310. The hosts 308, 310 may be self-configurable in that they may be aware of (e.g., know or store) a pre-loaded verifier value and associated values, but not of the secret value at the router 300. For example, the network 210 may be an Internet Protocol (IP) network compatible with IPv6 that uses neighbor discovery protocol (NDP). In such an example, the message may be a Router Advertisement (RA) message, and the self-authenticating message 306 may be an enhanced RA message in accordance with various aspects disclosed herein.

In some examples, when hashing at least part of the message to be a self-authenticating message 306, the router 300 may determine at least a portion of the message to be authenticated, and calculate a hash corresponding to the portion of the message to be authenticated. This router-generated hash may be calculated using a keyed-hashing for message authentication (HMAC) methodology (i.e., a router-HMAC). Other approaches to constructing a keyed message hash are contemplated for use in various examples herein. In addition to inserting the calculated router-HMAC into the message, a public ephemeral value (PEV) may also be inserted.

In the preceding example, the router 300 calculates a hash value using processing logic 302 (e.g., a microprocessor, an ASIC, or other hardware). In other examples, the router 300 may delegate the step of calculating a hash to a separate, trusted server computing device 106 in communication with the router 300. In any event, the calculations may use one or more configuration parameter values. Based on where the calculations will take place, the configuration parameter values may be stored in memory 304 at the router 300, or may be stored elsewhere. The router 300 may receive, in some examples via a secure communication channel, the configuration parameter values and use them to generate the PEV and other values. For example, the configuration parameters may correspond to an identification of a key exchange algorithm, an identification of a message digest algorithm, and an identification of an encryption/hashing algorithm for use in communicating on the network 210 between router 300 and hosts 308, 310.

The router 300 may use the one or more of the configuration parameter values and a secret value, which is known to the router 300, but not the host devices 308, 310, to generate various values, including, but not limited to, a random nonce, a PEV, a session key, and/or other values. The router 300 may use one or more of the random nonce, the PEV, and the session key to hash a portion of the message to generate a self-authenticating message 306.

Some examples of configuration parameters that may be defined, calculated, and/or recorded at the router 300 include, but are not limited to:

TABLE 1 alg = An asymmetric key agreement protocol (e.g., Diffie-Hellman)
hash = A cryptographic hash function (e.g., SHA-256)
hmac = A keyed-hash message authentication protocol (e.g., RFC 2104)
rtrname = Router name used to identify the router to hosts. The naming convention for routers may be arbitrary, and in some examples the router name may comprise all or a part of a media access control address, or "MAC" address (e.g., rtrname = 0x0050569f0d00 (Router MAC Address, e.g. 00:50:56:9f:0d:00))
password = Password associated with the above router name; used by the router to produce authenticated messages (e.g., password = password1234)
privatekey = hash(salt, password) (e.g., 0xfce560be37ac70bcada5309c5f2a78be58f631de43b6a82e9099689b1e5e1365)

TABLE 1-continued salt = Random string used as an additional input to privatekey. The salt may be the same size as the hash value; in this example, 256 bits to match the hash value of SHA-256 (e.g., 0xff3009ac12eae0e281f45f4614d6d497830e538ff83e31383df25c39daeafbc5)
prime = Prime number parameter of key exchange algorithm (e.g., 0x00c395a9033ee3a9e28fab263dedf5de5ad5f4efc691a0b2acd68f61c255191fb51fac98cea5e0c4b0db2600b1db3e3509e634f7754daac2e826e1078109b8ac2d38a0aefa2a52f15563eff2e4a14000ed5a1d3b23250e4b6fdbd5391be12955323cdee5862265c21d59cd3c788170d336c584e84daf96aa09a13eaf8f5aea9643)
generator = Generator parameter of key exchange algorithm (e.g., 0x2)
verifier = generator^privatekey mod prime (e.g., 0x79d26f6880abc3c490454275e8721acd596fafcac1e2d30467786a4bb68b0eacdc2733d7d4ca1973205e70a0e3c82179aacf87c4a3ac05e494a6661e7574bcea2c7207d21c16e635adca57261ec4f87eb3c33b77dc9776bec45ba6cb1bed7f43a22b6c3ace40e18fc81a1170b434638df456e22a8c747d61ca25dc8fa701a72)
multiplier = hash(prime, generator) (e.g., 0xa11c8d5a656147e98512051ad0942459b8a594a466b57c0be9b9fb4b5cd11f27)
staticvalue = Random string used as an additional input to PSV. The staticvalue may be the same size as the hash value; in this example, 256 bits to match the hash value of SHA-256 (e.g., 0xda74339f9ed7f9a7ab372cfc44952f499e8270740d9c05c508bcdc0a7f176ca5)
public static value ("PSV") = (multiplier * verifier + (generator^staticvalue mod prime)) mod prime (e.g., 0x56a9a1ac33c6916db04ccc8d0c5fa864f03ef73a4ea8314cf05be56672d7eede678a528e85e6d1a7ca5fdbfb8e214ebefee20daff53c7bc379b33a69dfe2e550a29b175f2c145fe913b3aa4b255e0665facfb1fb5414a6f077bff3b0e24f068de1460e596980d97d1da7cd5993e5f101c4979bbe0b244e0a60253bf4b907eb4f)

Some examples of configuration parameters that may be defined, calculated, and/or recorded at a host 308, 310 include, but are not limited to:

TABLE 2 alg = An asymmetric key agreement protocol (e.g., Diffie-Hellman)
hash = A cryptographic hash function (e.g., SHA-256)
hmac = A keyed-hash message authentication protocol (e.g., RFC 2104)
rtrname = Router name used to identify the router to hosts. A host may use this information to associate specific routers with the specific configuration parameters set forth in a stored table. (e.g., rtrname = 0x0050569f0d00 (Router MAC Address, e.g. 00:50:56:9f:0d:00))
verifier = generator^privatekey mod prime (e.g., 0x79d26f6880abc3c490454275e8721acd596fafcac1e2d30467786a4bb68b0eacdc2733d7d4ca1973205e70a0e3c82179aacf87c4a3ac05e494a6661e7574bcea2c7207d21c16e635adca57261ec4f87eb3c33b77dc9776bec45ba6cb1bed7f43a22b6c3ace40e18fc81a1170b434638df456e22a8c747d61ca25dc8fa701a72)
prime = Prime number parameter of key exchange algorithm (e.g., 0x00c395a9033ee3a9e28fab263dedf5de5ad5f4efc691a0b2acd68f61c255191fb51fac98cea5e0c4b0db2600b1db3e3509e634f7754daac2e826e1078109b8ac2d38a0aefa2a52f15563eff2e4a14000ed5a1d3b23250e4b6fdbd5391be12955323cdee5862265c21d59cd3c788170d336c584e84daf96aa09a13eaf8f5aea9643)
generator = Generator parameter of key exchange algorithm (e.g., 0x2)
multiplier = hash(prime, generator) (e.g., 0xa11c8d5a656147e98512051ad0942459b8a594a466b57c0be9b9fb4b5cd11f27)
staticvalue = Random string used as an additional input to PSV. The staticvalue may be the same size as the hash value; in this example, 256 bits to match the hash value of SHA-256 (e.g., 0xda74339f9ed7f9a7ab372cfc44952f499e8270740d9c05c508bcdc0a7f176ca5)
public static value ("PSV") = (multiplier * verifier + (generator^staticvalue mod prime)) mod prime (e.g., 0x56a9a1ac33c6916db04ccc8d0c5fa864f03ef73a4ea8314cf05be56672d7eede678a528e85e6d1a7ca5fdbfb8e214ebefee20daff53c7bc379b33a69dfe2e550a29b175f2c145fe913b3aa4b255e0665facfb1fb5414a6f077bff3b0e24f068de1460e596980d97d1da7cd5993e5f101c4979bbe0b244e0a60253bf4b907eb4f)

At least some of the aforementioned configuration data may be configured and/or produced on routers 300 participating in the generation of authenticated router messages. In some examples, the results of calculated values are configured on the hosts, and not the values used in such calculations. For example, hosts 308, 310 may be configured with the calculated value of the verifier, but lack knowledge of the privatekey value, which may be derived from other values, used to compute the verifier. Such an arrangement forms aspects of an end-to-end zero-knowledge password proof for router authentication ("ZKPPRA") solution described herein.

A portion of an illustrative script that might run, in some examples, on a router 300 in accordance with various aspects disclosed herein is shown in Table 3 below. The aforementioned illustrative script may import one or more Python libraries, including, but not limited to, one or more of hashlib, random, hmac, string, sys, binascii, and/or other libraries. Although the example of Table 3 is illustrated in Python, the disclosure contemplates other programming languages may be used to cause effectively the same result.

TABLE 3

```
# Define SHA-256 hash function subroutine
def hash(*a):
  return int(hashlib.sha256(str(a)).hexdigest( ), 16)
# Generate Diffie-Hellman Parameters (prime & generator)
# Generated using "openssl dhparam -text 1024"
hrprime = '''00:c3:95:a9:03:3e:e3:a9:e2:8f:ab:26:3d:ed:f5:
  de:5a:d5:f4:ef:c6:91:a0:b2:ac:d6:8f:61:c2:55:
  19:1f:b5:1fac:98:ce:a5:e0:c4:b0:db:26:00:b1:
  db:3e:35:09:e6:34:f7:75:4d:aa:c2:e8:26:e1:07:
  81:09:b8:ac:2d:38:a0:ae:fa:2a:52:f1:55:63:ef:
  f2:e4:a1:40:00:ed:5a:1d:3b:23:25:0e:4b:6f:db:
  d5:39:1b:e1:29:55:32:3c:de:e5:86:22:65:c2:1d:
  59:cd:3c:78:81:70:d3:36:c5:84:e8:4d:af:96:aa:
  09:a1:3e:af:8f:5a:ea:96:43'''
prime = int(''.join(hrprime.split( )).replace(':', ''), 16)
generator = 2
# Define/calculate other variables as needed
multiplier = hash(prime, generator)
rtrname = "0050569f0d00"
password = "password1234"
salt = random.SystemRandom( ).getrandbits(256)
privatekey = hash(salt, password)
verifier = pow(generator, privatekey, prime)
staticvalue =
0xda74339f9ed7f9a7ab372cfc44952f499e8270740d9c05c508bcdc0a7f176ca5
PSV = (multiplier * verifier + pow(generator, staticvalue, prime)) % prime
```

The illustrative script may be written in Python and may generate verifiers, key material, and other parameters used to demonstrate one example of a ZKPPRA solution. In one example demonstrating various aspects of a ZKPPRA solution, an illustrative method may progress through one or more stages, including, but not limited to a preparation stage, a production stage, a validation stage, and/or other stages.

Figure 4:
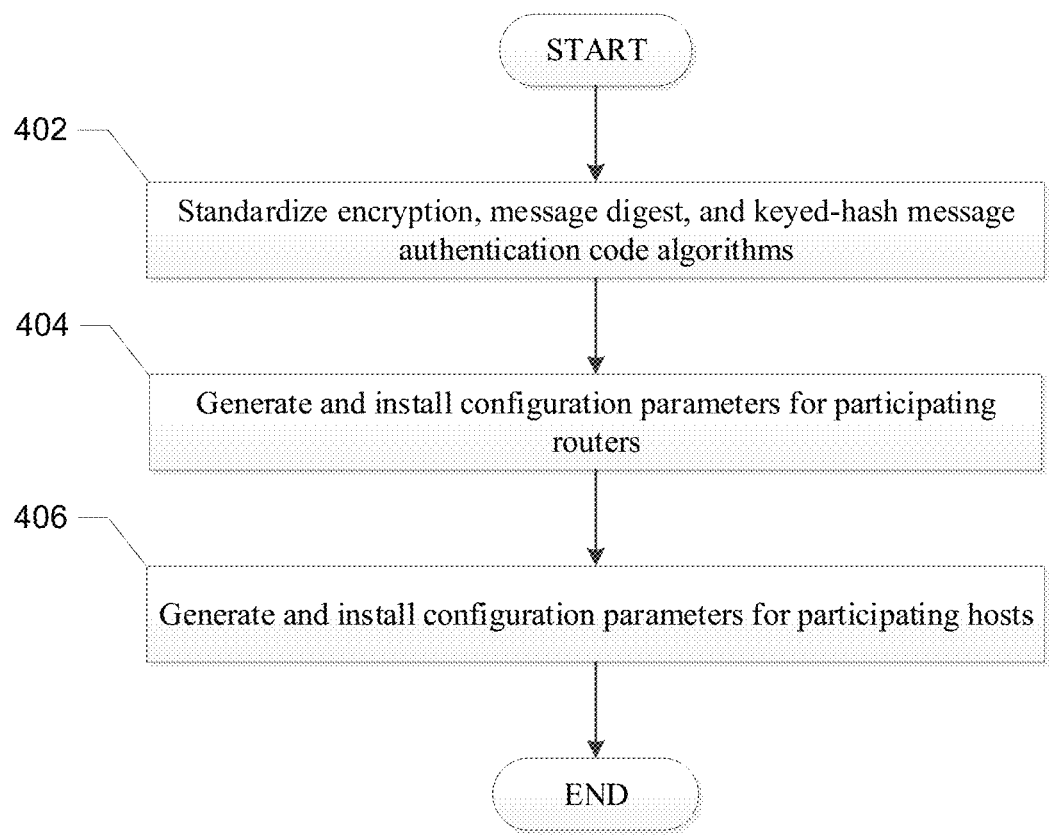
FIG. 4, FIG. 5, and FIG. 6 illustrate flowcharts according to one or more aspects of the disclosure.

In an illustrative preparation stage, a router 300 may be configured and prepared to produce authenticated protocol data units (PDUs), as shown in FIG. 4, using various aspects of a ZKPPRA solution including aspects of a secure remote password protocol ("SRP") and a PAKE protocol. SRP, by itself, is impractical for purposes of authenticating advertisements sent by a router 300 because SRP is bidirectional and point-to-point in nature, whereas Router Advertisements are unidirectional and one-to-many (i.e., multicast). The ZKPPRA solution may additionally be designed to facilitate non-interactive message authentication from router 300 to host 308.

During setup, the router 300 and host 308 may be in possession of particular information. For example, the router 300 may be in possession of at least the password and privatekey values. The host 308 may be in possession of at least the verifier value. In some examples, the router 300 and host 308 may both be in possession of values including, but not limited to, values for:

TABLE 4

Asymmetric Key Agreement Protocol: Diffie-Hellman
Hashing Algorithm: SHA-256
Keyed-hash Message Authentication Protocol: RFC 2104
Prime:
0x00c395a9033ee3a9e28fab263dedf5de5ad5f4efc691a0b2
acd68f61c255191fb51fac98cea5e0c4b0db2600b1db3e350
9e634f7754daac2e826e1078109b8ac2d38a0aefa2a52f1556
3eff2e4a14000ed5a1d3b23250e4b6fdbd5391be12955323c
dee5862265c21d59cd3c788170d336c584e84daf96aa09a13
eaf8f5aea9643L
Generator: 0x2
Verifier:
0x79d26f6880abc3c490454275e8721acd596fafcac1e2d30
467786a4bb68b0eacdc2733d7d4ca1973205e70a0e3c8217
9aacf87c4a3ac05e494a6661e7574bcea2c7207d21c16e635
adca57261ec4f87eb3c33b77dc9776bec45ba6cb1bed7f43a
22b6c3ace40e18fc81a1170b434638df456e22a8c747d61ca
25dc8fa701a72
Multiplier:
0xa11c8d5a656147e98512051ad0942459b8a594a466b57c
0be9b9fb4b5cd11f27L
Static Value:
0xda74339f9ed7f9a7ab372cfc44952f499e8270740d9c05c
508bcdc0a7f176ca5L
Public Static Value:
0x56a9a1ac33c6916db04ccc8d0c5fa864f03ef73a4ea8314c
f05be56672d7eede678a528e85e6d1a7ca5fdbfb8e214ebefe
e20daff53c7bc379b33a69dfe2e550a29b175f2c145fe913b3
aa4b255e0665facfb1fb5414a6f077bff3b0e24f068de1460e
596980d97d1da7cd5993e5f101c4979bbe0b244e0a60253bf
4b907eb4fL
Salt:
0xff3009ac12eae0e281f45f4614d6d497830e538ff83e3138
3df25c39daeafbc5L Referring to FIG. 4, as a result, in step 402, aspects of the communication between the router 300 and host 308 may be standardized. For example, encryption, message digest, and keyed-hash message authentication code algorithms may be standardized. In some examples, specific key exchange and message digest algorithms may be defined for all nodes participating in generation/verification of authenticated router messages (or at least all nodes in a given administrative domain or community; different communities might use different algorithms, if desired). For purposes of illustration, the ZKPPRA solution may use:

TABLE 5 alg = Diffie-Hellman Key Agreement Method, an example of which is defined by RFC 2631.
hash = the 256-bit variant of Secure Hash Algorithm (SHA-256) message digest, an example of which is defined by RFC 6234.
hmac = A keyed hash for message authentication, an example of which is defined by RFC 2104.

Moreover, in step 404, configuration parameters may be generated and installed for participating routers. Likewise, in step 406, configuration parameters may be generated and installed for participating hosts. In one example, PEV and subsequent key generations may be performed by the router 300. The router 300 may generate a nonce (e.g., a random value of the same size as the hash value produced by the selected hash algorithm, such as the 256-bit value:

0x457cb52343ca23fe5a4f52b6c51c8461f8cc7bd4 9e9ed0181ccd0c22f5941659). Then the router 300 may calculate a PEV (e.g., generator^nonce mod prime, to output PEV=0x83aecf5fdd8e8251a6bfb2ddb834e5952360b62b 759e53c7c34ad03ccafd3cd57359b030e9 cc5da237550d0cdc547be2d605a37c10f94102481a5630 d7342b660f2ce5c392a80fca9e431e 1b0b5bba39d7272e2a47c724d9eebaa64a35651a8760a 828c67aea6988c9880c1af3efef4481 6ed184bacbe73e87c2c633a4c11682). The router 300 may also calculate a scramble value (e.g., hash(PEV, PSV) to output scramble=
0x658c2fce8743f876b01c743ef02ae41f5f2fecc8bd 5f01dd74120f2406e80060. The router 300 may use the generated scramble and other values to calculate S_r (i.e., ((PSV−multiplier*(generator^privatekey mod prime))^ (nonce+scramble*privatekey) mod prime) to output S_r=
0x493d48b2a34c7bbba915155bbc2f53430c06b2 95f1886ac30d8c1cc7de61f335d60173342 259310802356cf31e533588bb688b227ab45fe06f 8e64458d5ebd7d59233f8c1994e611ea9df 5d41cd11628eb3045db20071fb9d2dc5b9be5f31c1 6738f79d0351b7cdac6ed0a1881354d82 0d3c9149f00dd6bb393abc644142c5c4). Finally, the router 300 may calculate a session routerkey (e.g., hash(S_r)) to output a routerkey=
0xba26b5914f29f924315a30d8d3767e2663d6 020788e59b554b799a74369a0f3b).

The ZKPPRA solution may make use of randomly generated nonces to, inter alia, deter replay attacks and/or to ensure the presence of fresh key material. Such an approach preserves that security posture to a partial extent by requiring routers 300 to similarly produce randomly generated values, which may subsequently be used to produce authenticated router messages. In some examples, the ZKPPRA solution may use per-session random nonces. This approach views the generation and/or reuse of the random values (referred to as public ephemeral values, or "PEVs") as configurable. This may provide support for high levels of router 300 performance, such as immediate responses to router solicitation request messages. As such, PEVs may persist and be reused: never (e.g. one-time use, effectively a nonce); for a specific period of time (e.g. one hour); and/or for a specific number of authenticated message transmissions (e.g. for 1,024 Router Advertisement messages or other types of messages).

After the preparation stage, the router 300 may transmit authenticated messages (e.g., authenticated Router Advertisements or other types of messages) using a generated routerkey as a secret cryptographic key to use with a keyed-hash message authentication code ("HMAC"), an example of which is defined by RFC 2104, which is herein incorporated by reference in its entirety.

Figure 5:
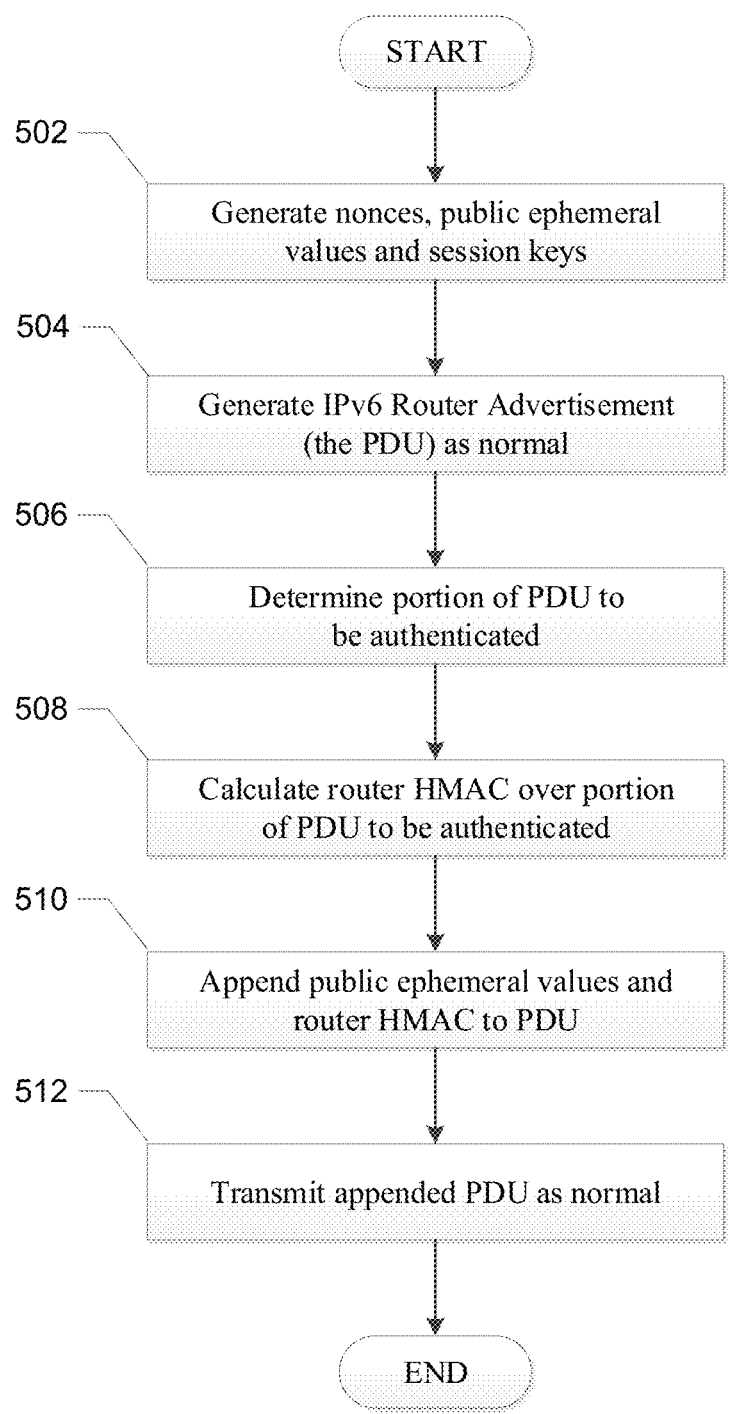

As illustrated in FIG. 5, in one example, during the production stage, authenticated protocol data units (PDUs) may be generated. In one example, in step 502, nonces, public ephemeral values and session keys may be generated. Furthermore, in step 504, the router 300 may generate normal PDUs, such as IPv6 Router Advertisements. The router 300 may determine, in step 506, a portion of the PDU to be authenticated. The portion may be some, none, or all of the appropriate parts of the PDU. The router 300 may use one or more of a nonce, PEV, and/or session keys to calculate, in step 508, a router-HMAC over the portion of the PDU to be authenticated:

TABLE 6

Nonce:
0x457cb52343ca23fe5a4f52b6c51c8461f8cc7bd49e9ed0181ccd0c22f594 1659L
Public Ephemeral Value:
0x83aecf5fdd8e8251a6bfb2ddb834e5952360b62b759e53c7c34ad03cc afd3cd57359b030e9cc5da237550d0cdc547be2d605a37c10f94102481a56 30d7342b660f2ce5c392a80fca9e431e1b0b5bba39d7272e2a47c724d9eeb aa64a35651a8760a828c67aea6988c9880c1af3efef44816ed184bacbe73e8 7c2c633a4c11682L
Scramble:
0x658c2fce8743f876b01c743ef02ae41f5f2fecc8bd5f01dd74120f2406e800 6fL
S_r:
0x493d48b2a34c7bbba915155bbc2f53430c06b295f1886ac30d8c1cc7de6 1f335d60173342259310802356cf31e533588bb688b227ab45fe06f8e6445 8d5ebd7d59233f8c1994e611ea9df5d41cd11628eb3045db20071fb9d2d c5b9be5f31c16738f79d0351b7cdac6ed0a1881354d820d3c9149f00dd6bb 393abc644142c5c4L
Session Key on Router:
0xba26b5914f29f924315a30d8d3767e2663d6020788e59b554b799a74369 a0f3bL The router 300 may calculate the specific Router Advertisement message options to be authenticated—i.e., Router Advertisement options (RAopts). The RAopts may comprise one or more Internet Control Message Protocol (ICMPv6) options, such as a source link-layer address (e.g., 00:50:56: 9f:0d:00), a maximum transmission unit value (e.g., 1280), and/or a prefix (e.g., 2001:db8:1234:5678::/64). These may be represented as consecutive strings of hexadecimal characters or other types of characters. As a result, in one example, RAopts may equal:
0x1010050569f0d00050100000000005000304 40c0ffiffiffiffiffiff0000000020010db81234567800 00000000000000L.

Subsequently, the router 300 may generate a keyed-hash message authentication code (HMAC) over all RAopts (e.g., RAhmac=hmac(routerkey, RAopts); such that RAhmac=0xfd2556f76abb5ef53e020fa134aafc68d 401a29ae74acf2473e2511c45f8a99e).

In step 510, the router 300 may append (or insert somewhere other than the end of the message) an additional message authentication option that may contain at least:

TABLE 7

New Option Type: 0x7b (illustrative new option type)
New Option Length: 0x18 (for this example; lengths may vary)
Public Ephemeral Value:
0x83aecf5fdd8e8251a6bfb2ddb834e5952360b62b759e53c7c34ad03ccafd 3cd57359b030e9cc5da237550d0cdc547be2d605a37c10f94102481a5630d 7342b660f2ce5c392a80fca9e431e1b0b5bba39d7272e2a47c724d9eebaa6 4a35651a8760a828c67aea6988c9880c1af3efef44816ed184bacbe73e87c2c 633a4c11682L
RAhmac:
0xfd2556f76abb5ef53e020fa134aafc68d401a29ae74acf2473e2511c45f8a 99e
Optional padding to align the message authentication option to a bit-aligned boundary: 0x00 as desired For example, a RAhmac value and optional padding value may be included in the additional message authentication option. For example, the optional padding may be used to align the option on a predetermined (e.g., 64-bit or other number of predefined bits) boundary, or as desired in accordance with prevailing standards. Likewise, the new option length field may be calculated based on the cumulative length of all fields in the option, and not necessarily a predefined value. In other words, it may be variable based on the message digest algorithm selected and PEV.

Although the preceding example involves the creation of a new router authentication option type for purposes of constructing an authenticated PDU, such an example should not constrain a ZKPPRA solution in accordance with the disclosure. Rather, other approaches may also be taken to demonstrate that the construction of a signed router authentication is feasible within the ZKPPRA solution.

In step 512, the router 300 may transmit the authenticated message (e.g., router announcement) as normal. For example, an illustrative message authentication option may appear in a network packet capture as follows:

0x7b1883aecf5fdd8e8251a6bfb2ddb834e5952360
b62b759e53c7c34ad03ccafd3cd57359b0
30e9cc5da237550d0cdc547be2d605a37c10f9410248
1a5630d7342b660f2ce5c392a80fca9e
431e1b0b5bba39d7272e2a47c724d9eebaa64a35651a
8760a828c67aea6988c9880c1af3efef
44816ed184bacbe73e87c2c633a4c11682fd2556f76a
bb5ef53e020fa134aafc68d401a29ae74
acf2473e2511c45f8a99e000000000000000000000
0000000000000000000000000000000000.

As illustrated in Table 7 above, the illustrative message authentication option above indicates with a starting "0x7b" that it corresponds to a new option type. Furthermore, the 0s padding appended to the illustrative message authentication option indicate that it is aligned to a bit-aligned boundary set by a new option length value.

Meanwhile, an illustrative ZKPPRA packet (including Ethernet and/or IP headers) might appear in a network packet capture as follows:

3333000000010050569f0d0086dd600000000100
3afffe80000000000000025056fffe9f0d00
ff0200000000000000000000000000018600db2200
080708000000000000000000010100505
69f0d000501000000000500030440c0ffffffffffffff0
000000020010db81234567800000000
000000007b1883aecf5fdd8e8251a6bfb2ddb834e59523
60b62b759e53c7c34ad03ccafd3cd5
7359b030e9cc5da237550d0cdc547be2d605a37c10f9
4102481a5630d7342b660f2ce5c392a
80fca9e431e1b0b5bba39d7272e2a47c724d9eebaa64a
35651a8760a828c67aea6988c9880c
1af3efef44816ed184bacbe73e87c2c633a4c11682fd25
56f76abb5ef53e020fa134aafc68d401
a29ae74acf2473e2511c45f8a99e0000000000000000000
000000000000000000000000 00000000000000. For illustrative purposes the aforementioned packet may be generated using a packet manipulation program (e.g., Scapy™) and captured with a network protocol analyzer (e.g., Wireshark™).

Figure 6:
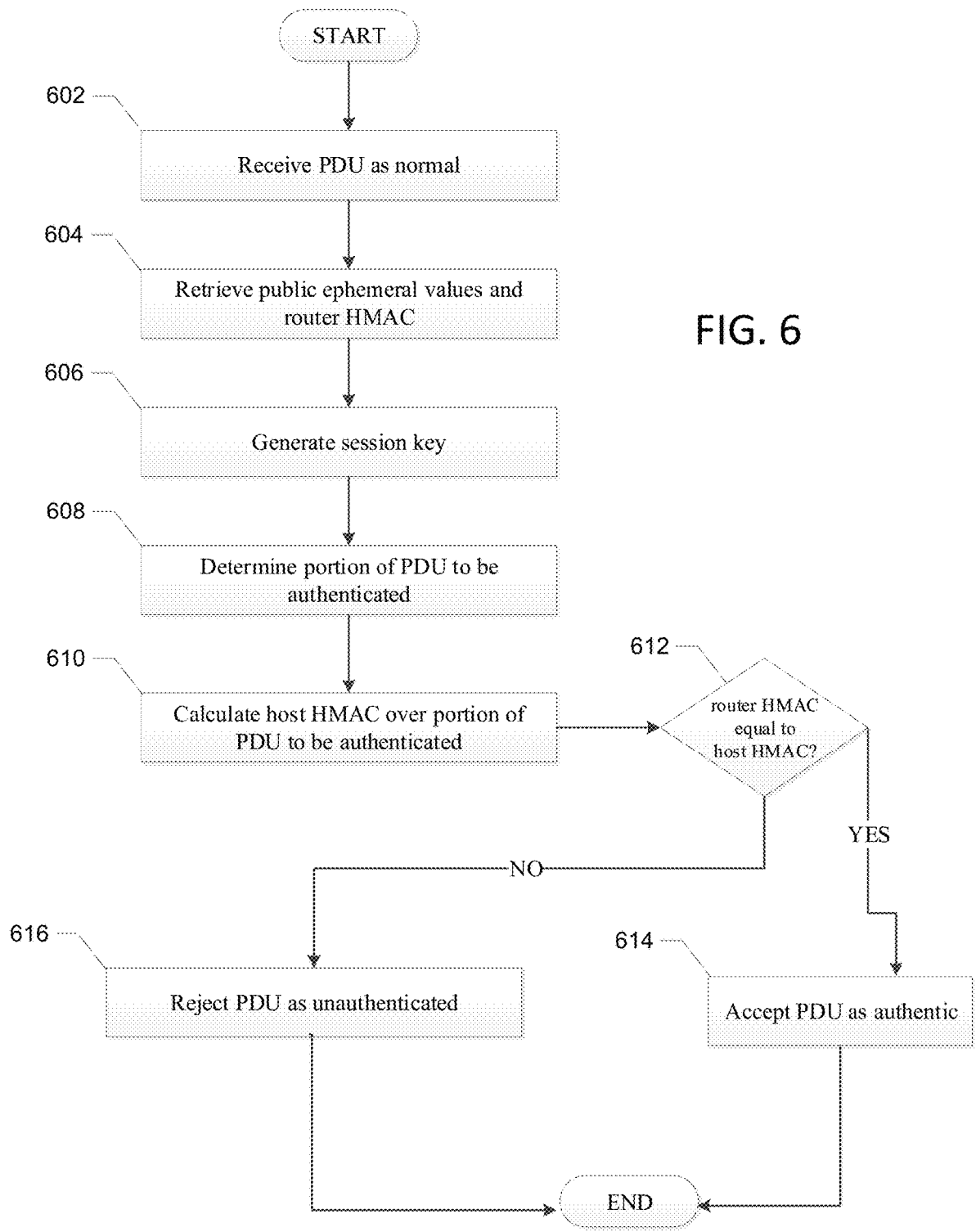

Referring to FIG. 6, steps performed by the system during a validation stage are illustrated. In step 602, a host 308 may receive a PDU (e.g., message 306) as normal. The message 306 may include a PDU of an IPv6 Router Advertisement message. The host 308 may process the incoming PDU (e.g., message 306) and examine the options portion of the PDU, which was created in the production stage. In a ZKPPRA solution, the host 308 may proceed with processing without necessarily needing to send back a PDU to the router 300. For example, in step 604, the host 308 may retrieve the PEV, RAhmac value, and/or other values from the new message authentication option. In addition, the host 308 may retrieve a public static value (PSV) and/or other values from the memory 304 of the host 308.

Collectively, these values may represent one or more of the parameters that may be used for a host to authenticate the PDU (e.g., message 306):

TABLE 8

Public Ephemeral Value:
0x83aecf5fdd8e8251a6bfb2ddb834e5952360b62b759e53c7c34ad03ccafd
3cd57359b030e9cc5da237550d0cdc547be2d605a37c10f94102481a5630d
7342b660f2ce5c392a80fca9e431e1b0b5bba39d7272e2a47c724d9eebaa64
a35651a8760a828c67aea6988c9880c1af3efef44816ed184bacbe73e87c2
c633a4c11682L
RAhmac:
0xfd2556f76abb5ef53e020fa134aafc68d401a29ae74acf2473e2511c45f8a
99e
Public Static Value:
0x56a9a1ac33c6916db04ccc8d0c5fa864f03ef73a4ea8314cf05be56672d7e
ede678a528e85e6d1a7ca5fdbfb8e214ebefee20daff53c7bc379b33a69df
e2e550a29b175f2c145fe913b3aa4b255e0665facfb1fb5414a6f077bff3b0e2
4f068de1460e596980d97d1da7cd5993e5f101c4979bbe0b244e0a60253bf
4b907eb4fL
Verifier:
0x79d26f6880abc3c490454275e8721acd596fafcac1e2d30467786a4bb68b
0eacdc2733d7d4ca1973205e70a0e3c82179aacf87c4a3ac05e494a6661e757
4bcea2c7207d21c16e635adca57261ec4f87eb3c33b77dc9776bec45ba6cb1
bed7f43a22b6c3ace40e18fc81a1170b434638df456e22a8c747d61ca25dc8f
a701a72
Prime:
0x00c395a9033ee3a9e28fab263dedf5de5ad5f4efc691a0b2acd68f61c25519
1fb51fac98cea5e0c4b0db2600b1db3e3509e634f7754daac2e826e1078109b
8ac2d38a0aefa2a52f15563eff2e4a14000ed5a1d3b23250e4b6fdbd5391be12
955323cdee5862265c21d59cd3c788170d336c584e84daf96aa09a13eaf8f5a
ea9643L
Static Value:
0xda74339f9ed7f9a7ab372cfc44952f499e8270740d9c05c508bcdc0a7f1
76ca5L A session key may be generated in step 606. The system may determine which portion of the PDU to authenticate in step 608, and then in step 610, the system may proceed to calculate a host HMAC value over that portion of the PDU to be authenticated. For example, the host 308 may calculate a scramble value (e.g., scramble=0x7f5dcb9ddbe03077e0d2013128b37a02c d2b94debc0feab969ded85db99a978c) by providing a PEV and PSV as inputs into a hash function. In addition, the host 308 may calculate a session key using numerous values available at the host 308. For example, the host 308 may use the generated scramble and other values to calculate S_s= (PEV*(verifier^scramble mod prime))^staticvalue mod prime. Finally, the host 308 may calculate a session hostkey (e.g., hash(S_s)) to output a hostkey=0xba26b5914f29f924315a30d8d3767e2663 d6020788e59b554b799a74369a0f3b). A sample session key value may be:

TABLE 9

S_s =
0x493 d48b2a34c7bbba915155bbc2f53430c06b295f1886ac30d8c1cc7de
61f335d6017334225931080 2356cf31e533588bb688b227ab45fe06f8e644
58d5ebd7d59233f8c1994e611ea9df5d41cd11628eb3045db20071fb9d2
dc5b9be5f31c16738f79d0351b7cdac6ed0a1881354d820d3c9149f00dd6b
b393abc644142c5c4
hostkey (i.e., session key on host) =
0xba26b5914f29f924315a30d8d3767e2663d6020788e59b554b799a7436
9a0f3b In addition, the host 308 may calculate specific message options (e.g., RA message options) within the received PDU (e.g., message 306) to be authenticated (i.e., HRAopts value=
0x1010050569f0d00050100000000050003044
0c0ffffffffffffff0000000020010db81234567800
00000000000000).

The host 308 may use one or more of the several values discussed above to determine an HMAC over all options (e.g., RAopts), by for example, host HMAC=hmac(hostkey, HRAopts). An illustrative value of the HMAC may be 0xfd2556f76abb5ef53e020fa134aafc68d401a29ae74acf 2473e2511c45f8a99e.

In step 612, the system determines whether the host HMAC value calculated in step 610 is the same as the router HMAC. If they are the same, then in step 614, the host 308 may accept the PDU (e.g., message 306) as authentic. Instead, if the host HMAC is not equal to the router HMAC, then in step 616, the host may flag the PDU as unauthenticated and reject the PDU. Rejecting the PDU (e.g., message 306) may include, but is not limited to, purging the PDU from memory, re-trying the comparison of the host HMAC to the router HMAC, quarantining the PDU in a memory storage area, inserting an entry in a log file, and/or other activity.

In accordance with various aspects disclosed herein, although various examples refer to "message," the message need not be limited to its traditional meaning. Rather, "message" may be in the form of a protocol data unit (PDU) or may be in the form of a plurality of fragmented data packets that, when later assembled, serve a similar function as a single message. Alternatively, "message" in some environments may be in the form of a stream of data, which when collected and collectively interpreted, may serve a similar function as a message. Finally, although several examples refer to Router Advertisement messages, the disclosure is not so limited; other message types may be used in the spirit of the features disclosed herein.

In addition, although various examples reference to IPv6 networks, the disclosure is not so limited. Any network on which a neighbor discovery protocol (or functionally similar unicast, multicast, or broadcast protocol) is being used to establish communication between two or more communicatively coupled devices (e.g., routers with network stacks that can communicate with appropriately enabled nodes) is contemplated, and "network" covers all such networks.

Furthermore, while protocols such as ICMP and NDP have been referenced in the disclosure, other similar protocols may be substituted for one or more of the referenced protocols. In addition, in some instances the existing, referenced protocols may be extended to support one or more of the features disclosed herein, such as authentication. Updates to protocols may result in one or more modifications to the router and/or host devices and their operating systems. Some examples of such modification to existing referenced protocols include creating a new type of ICMPv6 informational message (e.g., with a "Type 150" value type, which is currently unassigned) similar to the "Type 134" value type currently in use with Router Advertisement messages. Alternatively, a new code could be assigned to an existing message type or a new message type. For example, currently "Code 0" is used for Router Advertisement messages, but a new code value could be assigned for messages enhanced with one or more features disclosed herein. In yet another alternative, a new option may be added to the list of existing options for a given message type. For example, several options for Router Advertisement messages include a Source Link-Layer Address (Option Type 1) and Prefix Information (Option Type 3). A new option type value may be assigned for messages 306 sent in accordance with various features disclosed herein. For example, Option Type 123, which is currently unassigned, of Router Advertisement messages may be reserved for messages 306 sent by a router 300 in accordance with various aspects disclosed herein.

In addition, in some examples, the router 300 and hosts 308, 310 described herein may each be preloaded with configuration data to facilitate a ZKPPRA solution, as described herein. Examples include, but are not limited to, IT management frameworks, such as a group policy (e.g., Active Directory Group Policy for Microsoft Windows operating systems), mobile device management ("MDM") frameworks for managing configuration profiles for iOS devices like the iPhone, iPad, etc., connection manager frameworks, such as Wi-Fi Alliance's Passpoint™ initiative, and others. Furthermore, although an asymmetric key exchange protocol, such as Diffie-Hellman Key Agreement (as defined by RFC 2631, which is herein incorporated by reference in its entirety and a copy of which is being filed in an Information Disclosure Statement concurrent with this application filing), has been be described to support authentication of Router Advertisement messages, the disclosure is not so limited. Other protocols may be substituted or integrated into the protocol described herein while remaining within the spirit of the disclosure. Likewise, a cryptographically strong digest algorithm, such as the 256-bit variant of Secure Hash Algorithm (SHA-256) (as defined by RFC 6234, which is herein incorporated by reference in its entirety and a copy of which is being filed in an Information Disclosure Statement concurrent with this application filing), has been described to support authentication of Router Advertisement messages, the disclosure is not so limited.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

It is noted that various connections are set forth between elements in the following description. These connections are described in general and, unless specified otherwise, may be direct or indirect; this specification is not intended to be limiting in this respect.

What is claimed is:

1. A first computing device comprising:
   one or more processors; and
   memory comprising instructions that, when executed by the one or more processors, cause the first computing device to:
      determine, based on a private key of the first computing device, a verifier value that enables a second computing device to determine a session key that authenticates the first computing device to the second computing device;
      send, to the second computing device, the verifier value;
      determine, based on the private key, the session key;
      send a secure message that comprises:
         routing information associated with the first computing device, and a hash value, based on the routing information and the session key, that is usable by the second computing device to verify that the routing information is authentic and to verify the first computing device; and communicate, with the second computing device, using the session key.

2. The first computing device of claim 1, wherein the routing information comprises router advertisement options, and wherein the first computing device comprises a router.

3. The first computing device of claim 1, wherein the instructions, when executed by the one or more processors, cause the first computing device to:

receive one or more configuration parameter values corresponding to one or more of: an identification of a key exchange algorithm, an identification of a message digest algorithm, an identification of a keyed-hash message authentication code algorithm, a router name, a secret value, a salt value, a static value, a prime number, or a generator;

determine, based on the one or more configuration parameter values, a public static value that is stored by the second computing device; and determine, based on the one or more configuration parameter values and the public static value, a randomized value, wherein the secure message comprises the randomized value.

4. The first computing device of claim 1, wherein the instructions, when executed by the one or more processors, cause the first computing device to:

determine, based on one or more configuration parameter values received by the first computing device, a randomized value, wherein the hash value comprises a router hash message authentication code, wherein the secure message comprises additional router information for an authentication option, wherein the authentication option has a length based on the randomized value, and wherein the secure message further comprises the additional router information with the router hash message authentication code and the randomized value.

5. The first computing device of claim 1, wherein the instructions, when executed by the one or more processors, cause the first computing device to:

determine, based on one or more configuration parameter values received by the first computing device, a public static value that is stored by the second computing device;

determine, based on the public static value and a randomized nonce that has a message size equal to the hash value, a randomized value; and send the secure message by sending the randomized value.

6. The first computing device of claim 1, wherein the secure message further comprises a value indicating a predefined secure router advertisement message.

7. The first computing device of claim 1, wherein the instructions, when executed by the one or more processors, cause the first computing device to:

send, to the second computing device, an indication of a secure message type.

8. The first computing device of claim 1, wherein the instructions, when executed by the one or more processors, cause the first computing device to:

send, to the second computing device, an Internet Control Message Protocol (ICMP) message that indicates a zero-knowledge password proof router advertisement (ZKPPRA) message type.

9. The first computing device of claim 1, wherein sending the secure message is performed based on a multicast communication to a plurality of self-configurable host apparatuses, and wherein the plurality of self-configurable host apparatuses comprises the second computing device.

10. The first computing device of claim 1, wherein the session key is further determined based on one or more of:
a scrambling parameter;
a public static value of the first computing device; or
a public static value of the second computing device.

11. The first computing device of claim 1, wherein the routing information comprises one or more of:
an Internet Protocol version 6 (IPv6) router advertisement message;
a link-layer address associated with the first computing device; or
a maximum transmission unit (MTU) value.

12. The first computing device of claim 1, wherein the routing information comprises router advertisement options and the first computing device comprises a router.

13. The first computing device of claim 1, wherein the instructions, when executed by the one or more processors, cause the first computing device to:

receive, from the second computing device and based on the routing information, at least one message.

14. The first computing device of claim 1, wherein determining the session key is based on one or more of:
a public ephemeral value of the first computing device;
a public ephemeral value of the second computing device;
a salt value; or
a scrambling parameter that is based on at least: the public ephemeral value of the first computing device and the public ephemeral value of the second computing device.

15. The first computing device of claim 1, wherein the instructions, when executed by the one or more processors, cause the first computing device to:

hash a secret value of the first computing device to determine the private key; and wherein determining the verifier value is further based on a generator.

16. The first computing device of claim 1, wherein the verifier value is determined by applying a subset of a secure remote password (SRP) algorithm to a secret value of the first computing device, and wherein the second computing device completes the SRP algorithm using the verifier value to generate the session key.

17. A non-transitory computer-readable medium storing instructions that, when executed, cause:

determining, by a first computing device and based on a private key of the first computing device, a verifier value that enables a second computing device to determine a session key that authenticates the first computing device to the second computing device;

sending, by the first computing device and to the second computing device, the verifier value;

determining, by the first computing device and based on the private key, the session key;

sending, by the first computing device, a secure message that comprises:

routing information associated with the first computing device, and a hash value, based on the routing information and the session key, that is usable by the second computing device to verify that the routing information is authentic and to verify the first computing device; and communicating, by the first computing device and with the second computing device, using the session key.

18. The non-transitory computer-readable medium of claim 17, wherein the routing information comprises router advertisement options, and wherein the first computing device comprises a router.

19. The non-transitory computer-readable medium of claim 17, wherein the instructions, when executed, cause:

receiving, by the first computing device, one or more configuration parameter values corresponding to one or more of: an identification of a key exchange algorithm, an identification of a message digest algorithm, an identification of a keyed-hash message authentication code algorithm, a router name, a secret value, a salt value, a static value, a prime number, or a generator;

determining, based on the one or more configuration parameter values, a public static value that is stored by the second computing device; and determining, based on the one or more configuration parameter values and the public static value, a randomized value, and wherein the secure message comprises the randomized value.

20. The non-transitory computer-readable medium of claim 17, wherein the instructions, when executed, cause:

determining, based on one or more configuration parameter values received by the first computing device, a randomized value, wherein the hash value comprises a router hash message authentication code, wherein the secure message comprises additional router information for an authentication option, wherein the authentication option has a length based on the randomized value, and wherein the secure message further comprises the additional router information with the router hash message authentication code and the randomized value.

21. The non-transitory computer-readable medium of claim 17, wherein the instructions, when executed, cause:

determining, based on one or more configuration parameter values received by the first computing device, a public static value that is stored by the second computing device; and determining, based on the public static value and a randomized nonce that has a message size equal to the hash value, a randomized value; and sending the secure message by sending the randomized value.

22. The non-transitory computer-readable medium of claim 17, wherein the secure message further comprises a value indicating a predefined secure router advertisement message.

23. The non-transitory computer-readable medium of claim 17, wherein the instructions, when executed, cause:

sending, by the first computing device and to the second computing device, an Internet Control Message Protocol (ICMP) message that indicates a zero-knowledge password proof router advertisement (ZKPPRA) message type.

24. The non-transitory computer-readable medium of claim 17, wherein sending the secure message is performed based on a multicast communication to a plurality of self-configurable host apparatuses, and wherein the plurality of self-configurable host apparatuses comprises the second computing device.

25. The non-transitory computer-readable medium of claim 17, wherein the session key is further determined based on one or more of:

a scrambling parameter;

a public static value of the first computing device; or a public static value of the second computing device.

26. The non-transitory computer-readable medium of claim 17, wherein the routing information comprises at least one of:

an Internet Protocol version 6 (IPv6) router advertisement message;

a link-layer address associated with the first computing device; or a maximum transmission unit (MTU) value.

27. The non-transitory computer-readable medium of claim 17, wherein the routing information comprises router advertisement options and the first computing device comprises a router.

28. The non-transitory computer-readable medium of claim 17, wherein the instructions, when executed, cause:

receiving, from the second computing device and based on the routing information, at least one message.

29. The non-transitory computer-readable medium of claim 17, wherein determining the session key is based on one or more of:

a public ephemeral value of the first computing device;

a public ephemeral value of the second computing device;

a salt value; or a scrambling parameter that is based on at least: the public ephemeral value of the first computing device and the public ephemeral value of the second computing device.

30. The non-transitory computer-readable medium of claim 17, wherein the instructions, when executed, cause:

hashing, by the first computing device, a secret value of the first computing device to determine the private key, wherein determining the verifier value is further based on a generator.

31. The non-transitory computer-readable medium of claim 17, wherein the verifier value is determined by applying a subset of a secure remote password (SRP) algorithm to a secret value of the first computing device, and wherein the second computing device completes the SRP algorithm using the verifier value to generate the session key.

32. A system comprising:

a first computing device comprising:
first one or more processors; and
first memory storing first instructions; and a second computing device comprising:
second one or more processors; and
second memory storing second instructions, wherein the first instructions of the first memory, when executed by the first one or more processors, cause the first computing device to:
determine, based on a private key of the first computing device, a verifier value that enables the second computing device to determine a session key that authenticates the first computing device to the second computing device; and
send, to the second computing device, the verifier value; and wherein the second instructions of the second memory, when executed by the second one or more processors, cause the second computing device to:
receive, from the first computing device, the verifier value;
determine, based on the verifier value, the session key;
receive, from the first computing device via a network, a secure message that comprises:
routing information associated with the first computing device, and
a first hash value;
determine, based on the routing information and the session key, a second hash value;
determine, based on a comparison of the first hash value and the second hash value, that the routing information is authentic and that the first computing device is verified; and
send, to the first computing device and based on the routing information, at least one message.

33. The system of claim 32, wherein the routing information comprises router advertisement options, and wherein the first computing device comprises a router.

34. The system of claim 32, wherein the first instructions, when executed by the first one or more processors, cause the first computing device to:
receive one or more configuration parameter values corresponding to one or more of: an identification of a key exchange algorithm, an identification of a message digest algorithm, an identification of a keyed-hash message authentication code algorithm, a router name, a secret value, a salt value, a static value, a prime number, or a generator;
determine, based on the one or more configuration parameter values, a public static value that is stored by the second computing device; and
determine, based on the one or more configuration parameter values and the public static value, a randomized value, and wherein the secure message comprises the randomized value.

35. The system of claim 32, wherein the first instructions, when executed by the first one or more processors, cause the first computing device to:
determine, based on one or more configuration parameter values received by the first computing device, a public static value that is stored by the second computing device; and
determine, based on the public static value and a randomized nonce that has a message size equal to the first hash value, a randomized value; and
send the secure message by sending the randomized value.

36. The system of claim 32, wherein the secure message further comprises a value indicating a predefined secure router advertisement message.

37. The system of claim 32, wherein the first instructions, when executed by the one or more first processors, cause the first computing device to:
send, to the second computing device, an indication of a secure message type.

38. The system of claim 32, wherein the first instructions, when executed by first the one or more processors, cause the first computing device to:
send, to the second computing device, an Internet Control Message Protocol (ICMP) message that indicates a zero-knowledge password proof router advertisement (ZKPPRA) message type.

39. The system of claim 32, wherein the first instructions, when executed by the one or more first processors, cause the first computing device to send the secure message is based on a multicast communication to a plurality of self-configurable host apparatuses, and wherein the plurality of self-configurable host apparatuses comprises the second computing device.

40. The system of claim 32, wherein determining the session key is based on one or more of:
a scrambling parameter;
a public static value of the first computing device; or
a public static value of the second computing device.

41. The system of claim 32, wherein the routing information comprises one or more of:
an Internet Protocol version 6 (IPv6) router advertisement message;
a link-layer address associated with the first computing device; or
a maximum transmission unit (MTU) value.

42. The system of claim 32, wherein the routing information comprises router advertisement options and the first computing device comprises a router.

43. The system of claim 32, wherein the first instructions, when executed by the first one or more processors, cause the first computing device to:
receive, from the second computing device and based on the routing information, at least one message.

44. The system of claim 32, wherein determining the session key is based on one or more of:
a public ephemeral value of the first computing device;
a public ephemeral value of the second computing device;
a salt value; or
a scrambling parameter that is based on at least: the public ephemeral value of the first computing device and the public ephemeral value of the second computing device.

45. The system of claim 32, wherein the first instructions, when executed by the first one or more processors, cause the first computing device to:
hash a secret value of the first computing device to determine the private key; and
wherein determining the verifier value is further based on a generator.

46. The system of claim 32, wherein the verifier value is determined by applying a subset of a secure remote password (SRP) algorithm to a secret value of the first computing device, and
wherein the second one or more instructions, when executed by the second one or more processors, cause the second computing device to complete the SRP algorithm using the verifier value to generate the session key.

47. A second computing device comprising:
one or more processors; and
memory storing instructions that, when executed by the one or more processors, cause the second computing device to:
receive, from a first computing device, a verifier value that enables the second computing device to determine a session key that authenticates the first computing device to the second computing device;
determine, based on the verifier value, the session key;
receive, from the first computing device via a network, a secure message that comprises:

routing information associated with the first computing device, and a first hash value;
determine, based on the routing information and the session key, a second hash value;
determine, based on a comparison of the first hash value and the second hash value, that the routing information is authentic and that the first computing device is verified; and
send, to the first computing device and based on the routing information, at least one message.

48. The second computing device of claim 47, wherein the routing information comprises router advertisement options and the first computing device comprises a router.

49. The second computing device of claim 47, wherein the routing information comprises one or more of:
   an Internet Protocol version 6 (IPv6) router advertisement message;
   a link-layer address associated with the first computing device; or
   a maximum transmission unit (MTU) value.

50. A non-transitory computer-readable medium storing instructions that, when executed, cause:
   receiving, by a second computing device and from a first computing device, a verifier value that enables the second computing device to determine a session key that authenticates the first computing device to the second computing device;
   determining, by the second computing device and based on the verifier value, the session key;
   receiving, by the second computing device and from the first computing device via a network, a secure message that comprises:
      routing information associated with the first computing device, and
      a first hash value;
   determining, based on the routing information and the session key, a second hash value;
   determining, based on a comparison of the first hash value and the second hash value, that the routing information is authentic and that the first computing device is verified; and
   sending, to the first computing device and based on the routing information, at least one message.

51. The non-transitory computer-readable medium of claim 50, wherein the routing information comprises router advertisement options and the first computing device comprises a router.

52. The non-transitory computer-readable medium of claim 50, wherein the routing information comprises one or more of:
   an Internet Protocol version 6 (IPv6) router advertisement message;
   a link-layer address associated with the first computing device; or
   a maximum transmission unit (MTU) value.

* * * * *

UNITED STATES PATENT AND TRADEMARK OFFICE
CERTIFICATE OF CORRECTION

PATENT NO. : 11,728,999 B2
APPLICATION NO. : 17/144863
DATED : August 15, 2023
INVENTOR(S) : Zarcone et al.

It is certified that error appears in the above-identified patent and that said Letters Patent is hereby corrected as shown below:

On the Title Page

Column 2, Item (56) Other Publications, Line 1:
Delete "Algorthms," and insert --Algorithms,-- therefor In the Specification Column 1, Summary, Line 46:
After "disclosed.", delete "¶"

Column 11, Detailed Description, Line 14:
Delete "0." and insert --f).-- therefor Column 12, Detailed Description, Line 32:
Delete "0ffiffiffiffiffff0" and insert --0ffffffffffffff0-- therefor Column 13, Detailed Description, Line 35:
Delete "0ffiffiffiffiffff0" and insert --0ffffffffffffff0-- therefor Column 13, Detailed Description, Line 46:
Delete "00000000000000000000000000 00000000000000." and insert --000000000000000000000000000000000000000.-- therefor Signed and Sealed this
Tenth Day of December, 2024

Katherine Kelly Vidal
*Director of the United States Patent and Trademark Office*